United States Patent Office 3,476,008
Patented Nov. 4, 1969

3,476,008
STUD FOR ASSEMBLY IN AN APERTURED SUPPORT
Arthur Stanley Pearson, Sherwood, and David Julian Ford, Stapleford, England, assignors, by mesne assignments, to United-Carr Incorporated, Boston, Mass., a corporation of Delaware
Filed Sept. 15, 1967, Ser. No. 668,108
Claims priority, application Great Britain, Sept. 21, 1966, 42,171/66
Int. Cl. F16b 19/00
U.S. Cl. 85—5                                         1 Claim

ABSTRACT OF THE DISCLOSURE

Fastener stud provided with two or more shoulders on the outer surface of its shank and spaced at different distances from the head of the stud.

---

This invention relates to a stud for assembly in an aperture in a support to secure a member thereto.

According to the present invention, the stud for assembly in an aperture in a support comprises a head having an integral resilient shank extending from one face, the outer surface of the shank being formed with at least two shoulders each spaced at a different distance from the said face of the head.

The fastener stud is adapted for securing an article such as a trim panel to a support and in use the shank is inserted through aligned apertures in the article and support so that the head overlaps the outer face of the article to clamp it against the adjacent face of the support. One or other of the shoulders is adapted to engage the opposite face of the support adjacent the edge of the aperture so as to secure the parts in assembly.

By virtue of the differently spaced shoulders the fastener stud can be used with supports of different thickness.

The shank may be hollow and comprise two or more legs, each formed with a support engaging shoulder.

According to one embodiment of the invention, the stud fastener is formed as a one-piece moulding of synthetic plastics and comprises a substantially flat disc-like head extending radially outwardly of the shank, the shank being formed hollow and divided by longitudinally extending slots which define three legs integrally connected to one another at the free end of the shank. Two of the legs are formed with shoulders spaced the same distance from the head and the third leg is formed with a shoulder spaced a lesser distance from the head.

To enable the invention to be fully understood, it will now be described, by way of example, with reference to the accompanying drawings in which.

Figure 1:
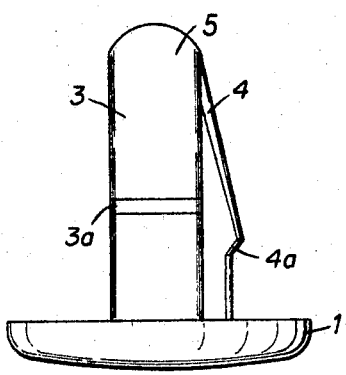
FIGURE 1 is a side view of a stud fastener according to one embodiment of the invention.
Figure 2:
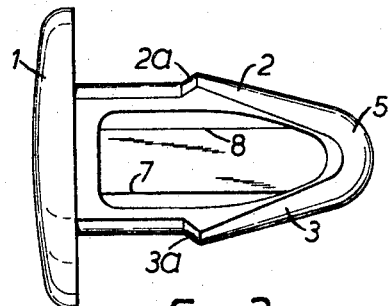
FIGURE 2 is a side view of the fastener stud turned through 180° from the position illustrated in FIGURE 1.
Figure 3:
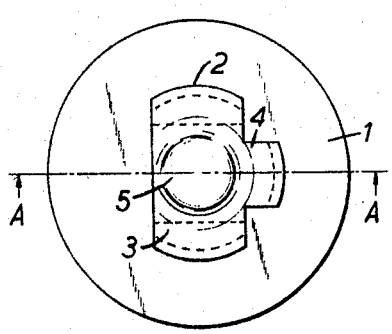
FIGURE 3 is a plane view.
Figure 4:
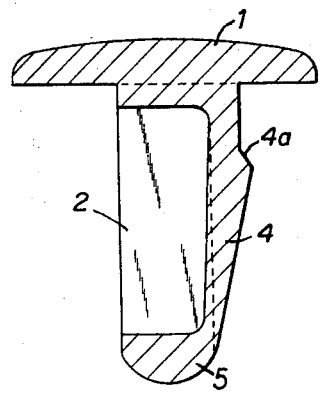
FIGURE 4 is a sectional view on the line A—A of FIGURE 3.
Figure 5:
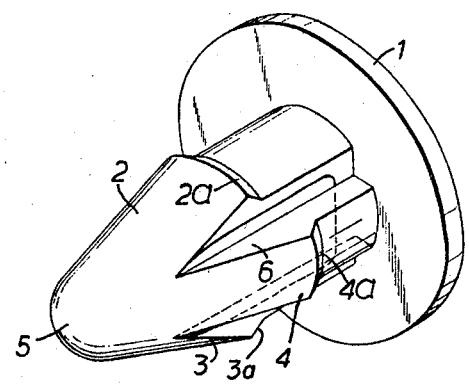
FIGURE 5 is a perspective view of the fastener stud on an enlarged scale.

As shown in the drawings, the stud fastener is a one-piece moulding of synthetic plastics and comprises a substantially flat disc-like head 1 having a resilient shank formed with longitudinal slots defining three legs 2, 3, 4 extending substantially normal from one face of the head. The legs are integrally connected by a nose portion 5 defining the free end of the shank. As shown, the shank is formed with axially extending slots 6 and 7 which space the leg 4 from the legs 2 and 3 and an axially extending slot 8 of substantially greater width which spaces the leg 2 from the leg 3.

The legs 2 and 3 are formed with shoulders 2a, 3a, located at equally spaced distances from the adjacent face of the head 1 and the leg 4 is formed with a shoulder 4a located at a lesser distance from the said face of the head.

The fastener stud is adapted for securing an article such as a trim panel to a support such as the door of a motor vehicle and in use, the panel is positioned over the support and the shank of the stud fastener inserted through aligned apertures in the panel and support so that the under face of the head, that is the face from which the shank extends, abuts the outer face of the panel. The shank extends through the aperture in the support and depending on the thickness thereof, the shoulders 2a, 3a, or the shoulder 4a will engage the portion of the support adjacent the edge of the aperture so that the parts will be retained in assembly.

In practice, supports to which trim panels or the like are to be secured vary in thickness and the provision of the differently located shoulders enables the stud to be used with supports having a fairly wide range of thicknesses.

The legs are readily resilient so that they can flex when they are snapped through the apertures.

While the stud described and illustrated comprises three legs, two of which have shoulders located the same distance from the head, it will be understood that, if desired, each of the three legs may have a shoulder located at a different distance from the head to the shoulder on any of the other legs. Further, two or more than three legs may be provided, all formed with shoulders and at least one of which is located at a different distance from the head to the shoulders on the other legs.

We claim:

1. A synthetic plastic stud for assembly in an apertured support comprising a head and a shank divided by longitudinal slots into at least three resilient shank sections integrally joined to said head at their inner ends and integrally joined to one another at their outer ends, the side edges of portions of said sections between their inner and outer ends being completely separated and laterally spaced, each of said shank sections having a shoulder formed thereon, at least one of said longitudinal slots having a width substantially greater than the other slots, at least two of said shank sections being diametrically opposed with the shoulders thereon being equally spaced from said head, the wider of said slots being between said two shank sections, the third shank section being intermediate the said two shank sections and being narrower than said wider slot, the shoulder on said third shank section being spaced from said head a different distance than the shoulders on said other two shank sections.

References Cited

UNITED STATES PATENTS

| 2,927,497 | 3/1960 | Rapata  | 85—5 |
|-----------|--------|---------|------|
| 3,271,059 | 9/1966 | Pearson | 85—5 |
| 2,778,032 | 1/1957 | Meehan  | 85—5 |
| 3,342,095 | 9/1967 | Buntic  | 85—5 |

FOREIGN PATENTS 1,020,694  2/1966  Great Britain.

EDWARD C. ALLEN, Primary Examiner